United States Patent

[11] 3,617,553

[72] Inventors: Michael Thomas Westaway, Ashford, Middlesex; Geoffrey Walker, Woking, Surrey, both of England
[21] Appl. No.: 805,336
[22] Filed: Mar. 7, 1969
[45] Patented: Nov. 2, 1971
[73] Assignee: The British Petroleum Company Limited, London, England
[32] Priority: Mar. 13, 1968
[33] Great Britain
[31] 12173/68

[54] CATALYST ULTRAFILTRATION PROCESS
25 Claims, 4 Drawing Figs.

[52] U.S. Cl. .................................................. 210/23, 210/500, 260/683.74
[51] Int. Cl. .................................................. B01d 13/00
[50] Field of Search ........................................ 210/22, 23, 321, 500, 503–509; 260/690, 683.74

[56] References Cited
UNITED STATES PATENTS

| | | | |
|---|---|---|---|
| 2,913,507 | 11/1959 | Binning et al. | 260/683.74 |
| 2,923,749 | 2/1960 | Lee et al. | 210/22 X |
| 2,953,502 | 9/1960 | Binning et al. | 210/23 X |
| 3,043,891 | 7/1962 | Stuckey | 210/23 X |
| 3,228,876 | 1/1966 | Mahon | 210/321 X |
| 3,412,174 | 11/1968 | Kroll | 260/683.9 |

OTHER REFERENCES

Loeb et al., "Sea water Demineralization by means of An Osmotic Membrane," from Advances in Chemistry Series 38 (American Chemical Society), Received in Patent Office 11-12-63, 199 pages, 117–129 relied on.

Sourirajan, "The Mechanism of Demineralization of Aquous Sodium Cholride Solutions by Flow, Under Pressure Through Porous Membranes," from I & EI Fundamentals, vol. 2, No. 1, Feb. 1963, pp. 51–55 relied on.

Primary Examiner—Frank A. Spear, Jr.
Attorney—Morgan, Finnegin, Durham and Pine

ABSTRACT: Transition metal complexes are separated from mixtures containing organic components of lower molecular weight by contacting the mixture with one side of a cellulosic membrane. The applied pressure is greater than the pressure on the opposite side of the membrane and the pressure differential is greater than the osmotic pressure of the system. The permeate has a reduced concentration of complex. The membrane is preferably a cellulose acetate membrane. Applied pressures are from 500 to 2,500 p.s.i.g. and complexes separated may be those of rhodium, nickel, vanadium and other metals of groups VII A and VIII of the Periodic Table. Organic components may be hydrocarbons or mixtures from the dimerisation of olefins or from the hydroformylation of propylene.

FIG.1.

CATALYST ULTRAFILTRATION PROCESS

This invention relates to methods of separation of compounds having an organic moiety and a transition metal from solutions containing organic compounds.

It is frequently desirable to separate metal-organic coordination complexes from organic liquids. A particular example of this is when such complexes are used as catalysts in homogeneous catalysis. These materials are likely to be expensive and may be thermally unstable so that separation by methods such as distillation may result in catalyst degradation and loss. Separation by a method that does not cause degradation of the complex would enable the catalyst to be used continuously.

We have found that separation may be achieved by causing the mixture of complex compound and organic liquid to come into contact with a membrane under pressure, so that a pressure differential exists across the membrane.

The invention accordingly provides a process for the separation of a coordination complex of a transition metal from a solution of the complex in one or more organic components which comprises bringing the mixture into contact with one side of a cellulosic membrane at an applied pressure greater than the pressure on the opposite side of the membrane, the pressure differential being greater than the osmotic pressure of the system and the molecular size and shape of the transition metal complex in relation to those of the organic components being such that, under the applied pressure, the permeate has a reduced content of the complex.

The invention further provides a continuous process of homogeneous catalysis which comprises reacting one or more organic components in the presence of one or more coordination complexes of a transition metal so as to produce a homogeneous fluid mixture, the reaction being carried out in a reaction system having an outlet across which is disposed a cellulosic membrane, the applied pressure on the reaction side of the membrane being greater than the pressure on the outlet side of the membrane, the pressure differential being greater than the osmotic pressure of the system and the molecular size and shape of the complex in relation to those of the organic components being such that under the applied pressure the permeate has a reduced concentration of complex and collecting products of reaction and any unreacted components which have permeated through the membrane.

The invention includes catalytic systems in which the membrane is external to the reaction system, for example where the conditions of separation, for example temperature and/or pressure, differ from those of reaction. Also included are systems in which one or more separation steps other than membrane separation exist between the reaction system and a membrane separation step external to it.

Preferably, in a catalytic process the products and any unreacted components are separated from each other after having permeated the membrane and the unreacted components may then be recycled if desired.

The term "transition metal" excludes the lanthanide and actinide elements and has the meaning assigned to it in "Advanced Inorganic Chemistry," Cotton and Wilkinson, 1962, pps. 493–495. The term "complex of a transition metal" means any compound containing one or more transition metal atoms and one or more ligands each capable of forming a coordinate bond in which the ligand acts as a donor. Preferably at least one ligand is organic i.e. contains carbon, and in this respect "organic ligands" are taken to include heterocyclic ligands. Possibly also at least one ligand is polydentate and more preferably chelate. The term "complex of a transition metal" further includes systems in which the transition metal complex itself is coexistent with, or in the case of a catalytic reaction is cocatalytic with or is promoted by an organometallic derivative of a nontransition metal, for example an aluminum alkyl, alkoxide, or alkyl-alkoxide.

"Organic components" referred to hereinbefore includes compounds containing carbon combined with elements such as hydrogen, oxygen, nitrogen, sulfur and phosphorus, for example, alcohols, aldehydes, ketones, organic acids, phosphines and amines.

The processes of the present invention may be employed in systems in which the organic components present are fluid under the conditions of temperature and pressure used.

The process of the present invention may be operated at applied pressures up to at least 2,500 p.s.i.g. Preferably the applied pressure is in the range 500 to 2,000 p.s.i.g. Preferably the operating temperature is in the range 15° to 70° C. Suitable concentrations of transition metal complex are in the range of 0.5 to 18,000 parts per million by weight. Suitable flow rates are from 1 to 50 cms. per second linear velocity above the membrane.

The term "fluid" used in this specification means liquid or vapor, but the former is preferred.

The processes of the present invention are most suitably used when the complex concentration is low e.g. below 500 p.p.m. and/or there is a large molecular weight difference between the complex and the organic components and other components to be separated. In the case of a catalytic reaction most suitably there is as large a difference in molecular weight as possible between the complex and the reaction products, and between the latter and the organic components of the feedstock.

The complex may contain a metal of Groups VIII or VIIA or VA of the Periodic Table according to Mendeleef.

The processes of the present invention may be employed in systems in which the organic components are hydrocarbons for example alkenes or alkanes having up to to 20 carbon atoms per molecule and preferably five or less carbon atoms per molecule, in which hydrogen and/or carbon monoxide or carbon dioxide may be present and in which the complex contains one or more of metals of Group VIII and Group VIIA of the Periodic Table according to Mendeleef and at least one biphyllic ligand and a bidentate ligand coordinating through at least one oxygen atom. Thus, for example, a suitable system in which the processes of the invention may be used is that in which a lower olefin is hydroformylated in the presence of carbon monoxide and hydrogen and a rhodium complex in which the biphyllic moiety is tri n-butyl phosphine and the bidentate moiety is acetylacetonate i.e. $Rh(Bu_3P)CO(acac)$. The products from this reaction are alcohols and/or aldehydes, depending on the catalyst concentration, and the reaction is further discussed in, U.S. application Ser. No. 779,443, filed Nov. 27, 1968, now U.S. Pat. No. 3,528,205. Another suitable system is that in which a lower olefin is dimerized in the presence of a nickel acetylacetonate complex promoted by aluminum diethylethoxide.

Other complexes which can be separated include the porphyrin complexes e.g. those of nickel and vanadium.

The cellulosic membrane referred to is preferably a cellulose acetate membrane. The molecular weight of the cellulose acetate may be within the range 10,000 to 100,000. Cellulose acetate having a molecular weight of from 10,000 to 50,000 is preferred. The membrane may be prepared from a solution of the appropriate cellulose derivative in enough solvent to ensure that the solution is not too viscous, together with a pore-forming agent and/or water. The pore-forming agent may, for example, be a perchlorate salt of formamide.

Cellulose acetate membranes obtained from Sartorius G.m.b.H. Germany and reported by Sartorius to contain pores in the range 50 to 100 A. have also been found to be suitable.

The cellulosic solution is cast on a plate and solvent allowed to evaporate until a thin surface skin forms on a film of the solution. The film is immersed in water at low temperature so as to produce a macroporous structure beneath the surface skin, and the membrane thus produced is conditioned for use in the presence of hydrocarbons by equilibrating it with a series of solutions containing a hydrocarbon component and a component miscible with water, the solutions having successively greater proportions of the former and smaller proportions of the latter component. Finally the film is immersed in a mixture of the feedstock to be used and the hydrocarbon component. Alternatively, the membrane may be conditioned by permeating isopropyl alcohol.

In the case of cellulose acetate membranes suitable thicknesses for the membranes have been found to be in the range 1 to $5\times10^{13}$ inches.

After preparation, but before conditioning, the film may be heated by immersion in hot water preferably at not less than 80° C. This can improve selectivity and complex retention.

Preferably the film is laterally restrained during conditioning and the above immersion in hot water. The nature of the film will also be affected by the conditions of casting, including the nature of the pore-forming agent, and the rate of evaporation of solvent. The actual method of preparation of the membrane film and its subsequent treatment may be established by experiment taking into account the system in which the membrane is to be used.

If prepared by casting as described above it is essential that the surface of the membrane exposed to the atmosphere during casting should be exposed to the feedstock in use, i.e. that this surface should be the upstream surface.

Cellulose acetate membranes for use in the processes of the present invention may be prepared as described in U.S. Pat. No. 3,133,132.

The membrane need not be in the form of a disc but should be in a form suitable to withstand the operating conditions to which it is subjected, particularly elevated pressure. To obtain a high output the maximum possible surface area of the membrane that can be achieved should be exposed to the components to be separated.

Operating conditions in the processes of the invention will depend mainly on the nature and method of conditioning of the membrane and also on the components to be separated. The main operating variables, however, are pressure, temperature and complex concentration. Nonoperating variables include the pore size and thickness of the membrane.

For cellulose acetate membranes made and conditioned as described in the following examples for the separation therein described, applied pressures of up to 2,500 p.s.i.g., temperatures in the range 15° to 70° C. and complex concentrations of up to 2.0 percent wt. were found to be suitable. The preferred applied pressure is in the range 500 to 2000 p.s.i.g. The complex concentration in a catalytic reaction is more a function of the reaction than of the membrane or the separation step itself.

The present invention is illustrated with reference to the flow system apparatus described in the accompanying drawings, in which.

Figure 1:
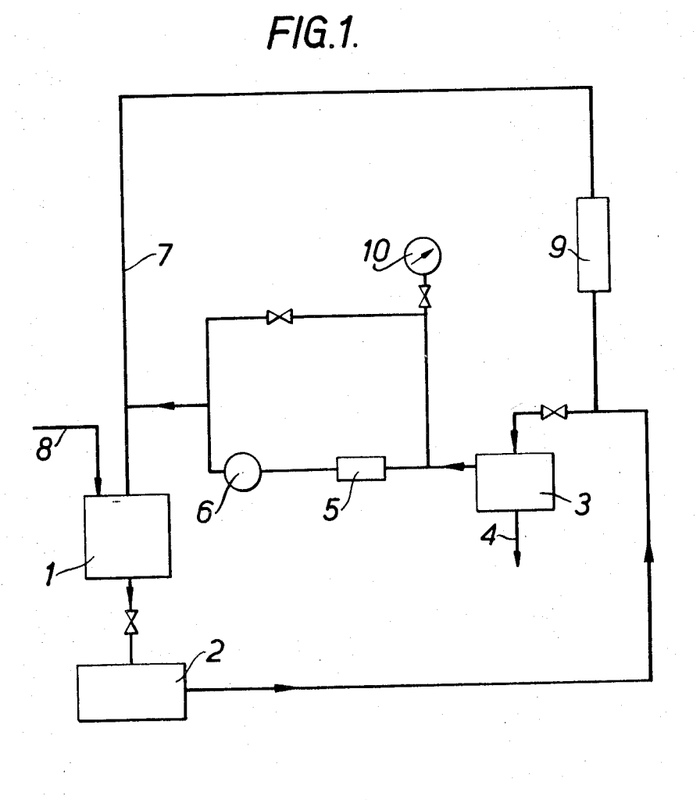
FIG. 1 shows schematically the high-pressure flow system used.

In FIG. 1 feedstock was supplied from a reservoir 1 at atmospheric pressure, to which dry nitrogen could be supplied if necessary via line 8. The feedstock was pressurized by means of a hydraulic ram pump 2 and supplied to the cell 3. Permeated material left the cell to collection via line 4. Nonpermeated material returned to the reservoir 1 via a felt filter 5 and a pressure control valve 6. A cell bypass line 7 was provided containing a pressure relief valve 9 operating at 3,000 p.s.i.g. Pressures were read from gauge 10.

Figure 2:
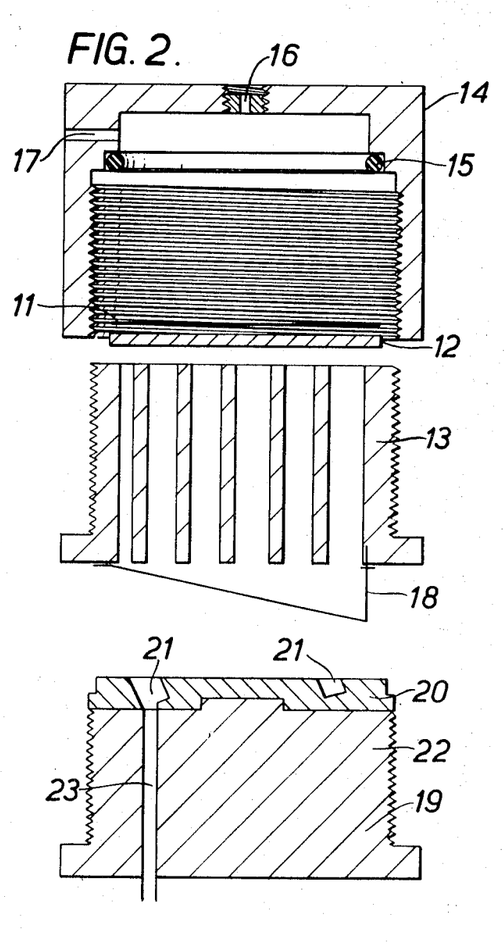
FIG. 2 shows in side elevation, and in expanded sectional form two forms of a typical high-pressure cell.

In FIG. 2 a membrane 11, diameter 6.5 cm., was supported on a sintered stainless steel disc 12, of pore size 60 microns, which in turn rested on a mild steel baseplate 13. By screwing the baseplate into stainless steel head 14 the membrane was sealed against nitrile rubber O-ring 15. Feedstock entered the cell through a 1 mm orifice 16 so as to create turbulence, and left the cell via outlet 17. The permeated material was collected in vessel 18.

The second form of the cell differed only in the baseplate, and the alternative baseplate 19 is shown in the lower part of FIG. 2. This consisted of a stainless steel plate 20 in which inclined channels 21 were cut mounted on a mild steel base 22. The permeated material drained to the collector through a stainless steel pipe 23.

The capacity of the cell above the membrane was 24 ml. Other methods of mixing than that referred to above may be used in a cell such as is described, for example a magnetic stirrer may be employed. Pressurization may also be carried out by other means than are described, for example by using nitrogen.

Figure 3:
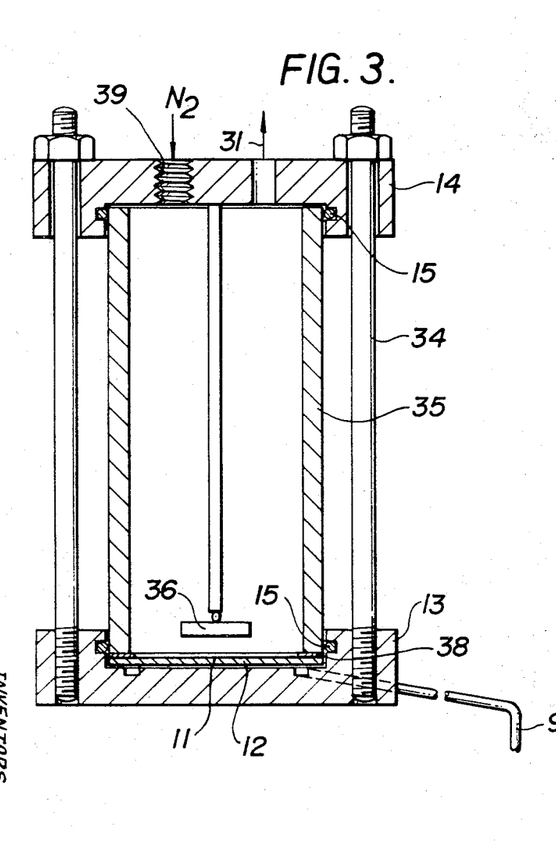
FIGS. 3 and 4 show other forms of the high-pressure cell.

In FIG. 3 a 150 ml., stainless steel, nitrogen pressurized cell comprises three parts, top plate 14 and plate 13 and barrel 35 held together by four rods 34. The membrane 11 having a permeable area of 11.4 cms.$^2$ is supported on a sintered stainless steel disc 12 of pore size 6 $\mu$ seated in the baseplate 13. The seal between the membrane 11 and the barrel 5 is made with a 1 mm. Teflon gasket 38 and between plates 14 and 13 and barrel 35 by nitrile O-rings 15. The top plate 14 contains a relief valve 31 and a connector opening 39 to the nitrogen supply. Turbulence in the cell is maintained by magnetic stirrer 36.

Figure 4:
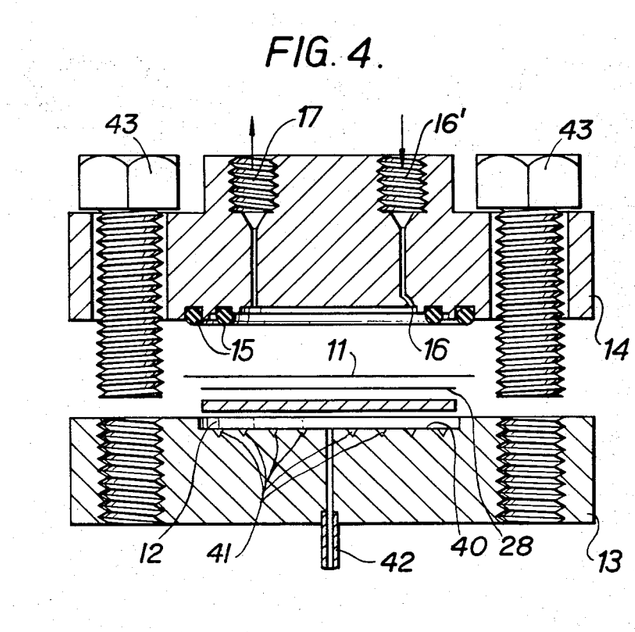

In FIG. 4 a stainless steel high pressure cell is shown. A membrance 11 7.8 cms. in diameter (permeable area 23 cm.$^2$) is cushioned by filter paper 28 and is supported on a sintered stainless steel disc 12 (of 6 $\mu$ pore size) resting in a circular recess 40 in the cell base 13. Gramaphone grooves 41 cut into the bottom of the recess facilitate permeable drainage through the drain pipe 42. Six allen capped screws 43 secure the cell top 14 and base 13 together, thereby sealing the membrane 11 against a nitrile or Teflon O-ring 15 carried in the cell top 14. An outer ring O-ring prevents permeate leaking to the outer edge of the sintered disc 12 and returning into the feed. To create turbulence in the cell, feedstock enters via a feed inlet opening 16 and then through a 1 mm. orifice 16. Feed leaves the cell via outlet 17. The dead volume of the cell is 3.5 ml.

The flow system and apparatus described were used to investigate the separation of three different catalyst complexes from their respective reaction mixtures, and conditions and the results obtained are given in the following examples. In these investigations rates of permeation (PR) per unit area of membrane were determined by measuring the volume of permeate collected over known periods of time. The metal contents of the permeates and feedstocks were measured by X-ray fluorescence so that the resistance of the membrane to catalyst permeation could be expressed in terms of catalyst retention (CR), where CR was the ratio, expressed as a percentage, of the difference between the metal content of the feedstock and the permeate to the metal content of the feedstock. Metal weight balances were made in selected cases so as to determine the quantitative nature of the separation. In these cases the metal content of the membrane itself was determined after dissolution in Dioxan. The nature of the catalyst complex remaining in the nonpermeated material was further investigated by means appropriate to the nature of the complex.

EXAMPLE 1

This example shows the separation of two complexes of rhodium from their reaction mixtures. The rhodium complexes were $Rh(Bu_3P)_2$ CO prop., molecular weight 609, (catalyst 1) and $Rh(Bu_3P)CO(acac$ (catalyst 2), where acac = acetylacetonate, Bu = n-butyl and prop = propionate. The molecular weight of the latter complex is 433. These catalysts are used in the hydroformylation of olefins with carbon monoxide and hydrogen to form aldehydes and alcohols and are examples of complexes disclosed in U.S. application Ser. No. 785,341, filed Dec. 19, 1968. The catalysts are both stable at room temperature and atmospheric pressure.

The reaction mixtures investigated were those resulting from the hydroformylation reaction and contained 0.002 mole percent of the rhodium complex, 5–10 mole percent hexenes and 90–95 mole percent linear and branched aldehydes. Reaction conditions were a temperature of 80° C. and pressure of 500 p.s.i.g.

The membranes used were made as previously described using formamide as the pore-forming agent. The YBP membranes were prepared from a casting dope comprising 25 percent cellulose acetate, 30 percent formamide and 45 percent acetone. The cellulose acetate obtained from Eastman Kodak had an acetyl content of 39.8 percent wt. and an ASTM viscosity of 3. The dope was cast onto a glass plate using a doctor knife for spreading and the film allowed to stand in the atmosphere for ½ to 1½ minutes so that the acetone partially evaporated to form a thin film. The film was then doused in cold water (0° to 30° C.) for 1 hour. The film was then floated off the glass plate. Some of the membranes were heat-treated, as shown in table 1, and all were conditioned using the solutions and immersion times outlined in table 2, the conditioning being carried out with the membrane clamped in the cell.

TABLE 1

| Reference | Thickness ×10³ in. | Heat Treatment |
|---|---|---|
| 1 | 5 | None |
| 2 | 5 | None |
| 3 | 5 | In water At 80–90° C. |
| 4 | 5 | |
| 5 | 5 | |
| 6 | 1.5 | None |

TABLE 2

| Solution % vol. | | Immersion Time (Minutes) |
|---|---|---|
| 90 ethanol | 10 n-heptane | 2 |
| 50 ethanol | 50 n-heptene | 1 |
| 10 ethanol | 90 n-heptane | 1 |
| 100 n-heptane | — | 1 |
| 50 n-heptane | 50 Feed | 1 |

Results obtained are given in table 3 below. These were obtained at a temperature of 22° C.

TABLE 3

Cell used as shown in Figure 2.

| Membrane | Catalyst | Pressure (psig) | Typical % CR | Permeation rate x 10² galls/day/ft² |
|---|---|---|---|---|
| 1a | 1 | 200 | 96.0 | 116 |
| 1a | 1 | 2250 | 98.0 | 678 |
| 1b | 1 | 750 | 99.0 | 390 |
| 2a | 1 | 10–15 | 97.0 | 9.8–19.6 |
| 2a | 1 | 15–25 | 95.0 | 19.6–39.2 |
| 2b | 1 | 250 | 98.0 | 63 |
| 2b | 1 | 750–1250 | 98.0 | |
| 3 | 1 | 30 | 94.0 | 29.4 |
| 4 | 1 | 40 | 94.0 | 24.5 |
| 5 | 1 | 50 | 94.0 | <0.5 |
| 6 | 1 | 40 | 89.0 | 12.3 |
| 6 | 2 | 40 | 89.0 | 21.6 | a) and b) refer to two different membranes cut from the same original sheet.

In all cases the catalyst was unchanged after the separation process. Rhodium weight balances showed the separation to be quantitative while the phosphorous content of the complex remained in constant ratio to the rhodium content. The activity of the catalyst in the concentrated feedstock was unimpaired. Membrane surfaces were not contaminated with precipitated catalyst.

In examples 2–6 the membranes were conditioned prior to use by permeating 20–30 mls. of isopropanol under 60–500 p.s.i.g. applied nitrogen pressure. The operating temperature was room temperature unless otherwise stated.

EXAMPLE 2

$Rh(Bu_3P)$ CO acac was separated from mixtures obtained from the hydroformylation of propylene in which the reaction conditions were 120° C. and 800 p.s.i.g. The first mixture, designated light ends (LE) was the depropanised reaction product. The second mixture, designated heavy ends (HE) was the light ends from which the low boiling components (boiling <120° C.) had been removed by vacuum distillation and rotary film evaporation. The heavy ends comprised 1 to 2 percent of the light ends.

Cellulose acetate membranes of two types both of $5\times10^{13}$ inches in thickness were used:
a. As previously described and designated YBP.
b. As supplied by Sartorius Membrane filter G.m.b.H. Germany. These latter membranes described as 'very dense' are reported by Sartorius to contain pores 50–100 A. in diameter. Analyses show the cellulose acetate to contain 38 percent wt. acetyl and to have a number average molecular weight of 46,000 as determined by osmometry.

TABLE 4

Light Ends (circulating system at 40–50 ml min⁻¹). Catalyst concentration 380–480 ppm. System as in Fig. 1. Cell as in Fig. 4.

| Membrane | Pressure (psig) | % CR | PR (galls/ day/ft²) |
|---|---|---|---|
| Sartorius No. 1 | 2000 | 94 | 2.62 |
| | 1500 | 93 | 2.00 |
| | 1000 | 93 | 1.32 |
| | 500 | 93 | 0.73 |
| Sartorius No. 2 | 500 | 86 | 4.3 |
| | 1000 | 87.5 | 4.8 |
| | 2000 | 86 | 3.9 |

TABLE 5

Heavy Ends

| Membrane | Pressure psig | % CR | PR galls/ day/ft² | Catalyst Concn. (ppm) | Cell as in Fig. 3 or 4 |
|---|---|---|---|---|---|
| Sartorius No. 3 | 400 | 73 | 0.72 | 924 | 3 |
| Sartorius No. 4 | 500 | 90 | 0.43 | 11,000 | 3 |
| Sartorius No. 5 | 1500 | 93.5 | 0.38 | 11,000 | 4 |
| Sartorius No. 6 | 1500 | 73 | 0.42 | 656 | 4 |
| YBP 1 | 400 | 87 | 0.28 | 924 | 3 |
| YBP 2 | 1500 | 93 | 0.14 | 656 | 4 |

EXAMPLE 3

This example demonstrates the effect of temperature on the separation of $Rh(Bu_3P)CO$ acac from heavy ends. The nitrogen pressurized cell shown in FIG. 3 was used. Catalyst concentration was 540 p.p.m.

TABLE 6

| Membrane | Temp °C | Pressure psig | % CR | PR galls/ day/ft² |
|---|---|---|---|---|
| Sartorius No. 7 | 24 | 510 | 90 | 0.17 |
| | 41 | 510 | 96 | 0.55 |
| | 56.5 | 510 | 82 | 1.01 |

EXAMPLE 4

Effect of toluene dilution on permeation of heavy ends at 1,500 p.s.i.g.—circulating system used. (40 ml. min.⁻¹) Cell as FIG. 4.

TABLE 7

| Membrane | Dilution % v/v Toluene/ feed | Kinematic Viscosity (c. stoke) | Overall PR galls/day/ft² | PR of HE galls/day/ft² | % CR | Catalyst Concn. (ppm) |
|---|---|---|---|---|---|---|
| Sartorius No. 8 | 11.4 | 4.9 | 1.0 | 0.84 | 93 | 10,080 |
| | 19.4 | 3.35 | 1.11 | 0.82 | 95 | 9,120 |
| | 34.1 | 1.83 | 1.31 | 0.68 | 97 | 8,240 |
| | 0 | 8.3 | 0.35 | 0.35 | 97 | 11,000 |

This example shows the effect of dilution by light end product. Pressure to 400 p.s.i.g. Cell used as shown in FIG. 3.

TABLE 8

| Membrane | Dilution % v/v LE/feed. | Kinematic Viscosity (c. stokes) | Overall PR galls/day/ft² | PR of HE | % CR | Catalyst Concn. ppm |
|---|---|---|---|---|---|---|
| Sartorius No. 9 | 0 | 12.4 | 0.72 | 0.72 | 73 | 908 |
|  | 13 | 6.4 | 1.63 | 1.42 | 75 | 812 |
|  | 20 | 4.9 | 1.90 | 1.52 | 71 | 768 |
|  | 30 | 3.4 | 2.22 | 1.56 | 76 | 716 |

EXAMPLE 5

This example shows the separation of Rh(Bu₃P)CO acac from 2-ethylhexanal and also from a n-heptane/heptaldehyde mixture.

TABLE 9

| Membrane | Solvent | Rh(acac) Concn (ppm) | Pressure psig | % CR | PR galls/day/ft² |
|---|---|---|---|---|---|
| Sartorius No. 10 (cell as fig. 3) | 50/50 v/v n-heptane/heptaldehyde | 305 | 95 | 88 | 1.0 |
| Sartorius No. 11 (cell as fig. 4) | 2-ethylhexanal | 3,240 |  | 95.0 | 12.50 |
|  |  | 3,580 |  | 94.0 | 12.30 |
|  |  | 5,060 | 1000 | 97.5 | 10.45 |
|  |  | 10,000 |  | 97.5 | 8.40 |
|  |  | 17,120 |  | 96.0 | 8.75 |
|  |  | 18,420 |  | 97.0 | 7.50 |

EXAMPLE 6

Example 6 demonstrates the separation of different rhodium complexes from toluene. The rhodium complexes were made into solution with toluene up to 200 p.p.m. Separation was effected using a nitrogen pressurized cell as shown in FIG. 3 at 400 p.s.i.g.

TABLE 10

| Complex | PR galls/day/ft.² | % CR |
|---|---|---|
| Rh(Et₃P)₂COCl | 3.4 | 27 |
| Rh(i-Pr₃P)₂COCl | 3.4 | 31 |
| Rh(Bu₃P)₂COCl | 3.4 | 36 |

In the formulas Et represents ethyl and iPr represents isopropyl.

Example 7

In this example, the system used was that obtained by dimerisation of hexenes in the presence of a catalyst consisting of 0.005 molar nickel acetylacetonate and 0.005 molar aluminum diethylethoxide. The reaction mixture also contained 94.5 percent vol. hexenes and 5.5 percent vol. toluene and was investigated soon after the reaction was initiated. The dimerisation of hexenes is estimated to require from 3 to 6 days for completion, after which time the dodecene concentration would be 25 percent weight. The catalyst requires oxygen-free and water-free conditions so the cell parts were washed in dry pentane and dried in nitrogen before assembly. The membrane was mounted in the cell, flushed with dry 1:14 v./v. hexene/toluene and then with feedstock displaced with nitrogen from the reactor vessel. Finally the cell was filled with feedstock. The membranes used were conditioned by the method of table 2. Results, obtained at a temperature of 22°C. are given in table 11 below:

TABLE 11

Cell used as shown in FIG. 2.

| Membrane | Pressure (p.s.i.g.) | % CR | Permeation Rate galls/day/ft.² |
|---|---|---|---|
| YBP 2 | 15 | 99 | 3.8 |
|  | 40 | 99 | 1.08 |
| YBP 4 | 40 | 99 | 0.71 |

It will be seen that almost complete catalyst retention occurred, but that the permeation rate decreased (after 4 to 5 hours on test). This coincided with slight precipitation, possibly due to hydrolysis of the complex by traces of water. The permeation rate was restored by rewashing the membrane and cell with feedstock and renewing the feedstock.

EXAMPLE 8

A Sartorius UFF cellulose acetate membrane designated "very dense" was heat treated in water for 1 hour at 70°C. It was then used to separate nickel etioporphyrin at a concentration of 234 p.p.m. from toluene using the cell shown in FIG. 3. The applied pressure was 400 p.s.i.g., the solvent permeation rate was 0.42 ml. per hour per cm.² and the solute retention was 80 percent.

What we claim is:

1. A process for the separation of a coordination complex of a transition metal from a solution of the complex in one or more organic components having a lower molecular weight than the complex, which comprises bringing the solution into contact with one side of a cellulose acetate membrane at an applied pressure greater than the pressure on the opposite side of the membrane, the pressure differential being greater than the osmotic pressure of the system and the molecular size and shape of the transition metal complex in relation to those of the organic components being such that under the applied pressure the liquid permeate has a reduced content of the complex.

2. A process according to claim 1 in which the cellulose acetate has a molecular weight in the range 10,000 to 50,000.

3. A process according to claim 1 in which the process is effected at an applied pressure in the range 500 to 2,500 p.s.i.g., and at a temperature in the range 15° to 70°C.

4. A process according to claim 1 in which the concentration of transition metal complex is in the range 0.5 to 18,000 parts per million.

5. A process according to claim 1 in which the thickness of the membrane is from 1.0 to 5×10¹³ ins.

6. A process according to claim 1 in which the membrane is treated, prior to use, by immersion in water at a temperature above 80°C. to improve selectivity and catalyst retention.

7. A process according to claim 6 in which water treatment, but prior to use, the membrane is conditioned either by treatment with a series of solutions containing a hydrocarbon component and a component miscible with water, the solutions having successively greater proportions of the former and smaller proportions of the latter component or by permeating isopropyl alcohol.

8. A process according to claim 7 in which the membrane prior to conditioning has pores of 50 to 100 A. in diameter.

9. A process according to claim 1 wherein the complex contains a metal of Group VIII or VIIA or VA of the Periodic Table according to Mendeleef.

10. A process according to claim 9 in which the metal complex is nickel acetylacetonate or a nickel or vanadium etioporphyrin.

11. A process according to claim 9 in which the Periodic Table according to Mendeleef.

10. A process according to claim 9 in which the metal complex is nickel acetylacetonate or a nickel or vanadium etioporphyrin.

11. A process according to claim 9 in which the metal complex is a

12. A process according to claim 11 in which the metal complex has the formula: $Rh(Et_3P)_2\ CO\ Cl$, $Rh(iPr_3P)_2\ COCl$ or $Rh(Bu_3P)_2\ COCl$ where Et is an ethyl radical, iPr is an isopropyl radical and Bu is a butyl radical.

13. A process according to claim 11 in which the solution comprises n-heptane, n-heptaldehyde and 2-ethylhexanol.

14. A process according to claim 11 in which the solution comprises the reaction product of the hydroformylation of propylene from which unreacted propylene has been removed.

15. A process according to claim 1 in which the organic components comprise alkenes or alkanes having up to 20 carbon atoms per molecule.

16. A process according to claim 15 in which the metal complex is $Rh(Bu_3P)\ CO(acac)$ or $Rh(Bu_3P)_2\ CO$ propionate where Bu represents n-butyl and acac represents acetylacetonate.

17. A process according to claim 15 in which the solution comprises the reaction product of the hydroformylation of propylene from which propylene and the components boiling below 120° C. have been removed.

18. A process according to claim 1 in which the solution comprises the reaction product of the hydroformylation of a lower olefin in the presence of carbon monoxide and hydrogen.

19. A process according to claim 1 in which the solution comprises the dimerization product of a lower olefin.

20. A process according to claim 1 in which the organic component comprises toluene.

21. A process according to claim 1 in which a diluent is added to the solution to enhance the permeation rate.

22. A process according to claim 21 in which the diluent is toluene.

23. Coordination complexes of transition metals whenever separated by a process according to claim 1.

24. A continuous process of homogeneous catalysis which comprises reacting a hydrocarbon in the presence of a coordination complex of a transition metal to produce a solution of the complex in the reaction mixture and separating the coordination complex from the reaction mixture by a process according to claim 1.

25. A process according to claim 24 wherein the reaction is carried out in a reaction system having an outlet across which the membrane is disposed.

PO-1050
(5/69)

UNITED STATES PATENT OFFICE
CERTIFICATE OF CORRECTION

Patent No. 3,617,553          Dated November 2, 1971

Inventor(s)  Michael Thomas Westaway and Geoffrey Walker

It is certified that error appears in the above-identified patent and that said Letters Patent are hereby corrected as shown below:

Col. 1, Line 1,
for "separation of"    read    -- separating --

Col. 1, Line 70,
for "cocatalytic"    read    -- co-catalytic --

Col. 3, Line 5,
for "$5x10^{13}$"    read    -- $5x10^{-3}$ --

Col. 3, line 65, "60"    read    -- 6 --

Col. 4, Line 10,
for "and plate 13"    read    -- and base plate 13 --

Col. 4, Line 14,
for "barrel 5"    read    -- barrel 35 --

Col. 4, Line 18,
for "valve 31"    read    -- valve opening 31 --

Col. 4, Line 30,
for "ring O-ring"    read    -- 'O' ring --

UNITED STATES PATENT OFFICE
CERTIFICATE OF CORRECTION

Patent No. 3,617,553  Dated November 2, 1971

Inventor(s) Michael Thomas Westaway and Geoffrey Walker  PAGE -2

It is certified that error appears in the above-identified patent and that said Letters Patent are hereby corrected as shown below:

| | | |
|---|---|---|
| Col. 4, Line 33, for "opening 16" | read | -- opening 16' -- |
| Col. 5, Line 11, for "30°C" | read | -- 3°C -- |
| Col. 5, Table 2, for "50n-heptene" | read | -- 50n-heptane -- |
| Col. 6, Line 12, for "$10^{13}$" | read | -- $10^{-3}$ -- |
| Col. 6, Line 65, for "40 ml. min.$^{11}$" | read | -- 40 ml. min.$^{-1}$ -- |
| Col. 7, Line 2, for "Pressure to 400" | read | -- Pressure 400 -- |
| Col. 8, Table 11, right-hand column, for "ft.2" | read | -- ft.$^2$ -- |
| Col. 8, Claim 5, Line 2, for "$10^{13}$" | read | -- $10^{-3}$ -- |

UNITED STATES PATENT OFFICE
CERTIFICATE OF CORRECTION

Patent No. 3,617,553      Dated November 2, 1971

PAGE - 3

Inventor(s) Michael Thomas Westaway and Geoffrey Walker

It is certified that error appears in the above-identified patent and that said Letters Patent are hereby corrected as shown below:

Col. 8, Claim 7, Line 1, for "in which water treatment" read -- in which after the water treatment --

Col. 8, Lines 70-71, delete:
"11. A process according to claim 9 in which the Periodic Table according to Mendeleef."

Col. 8, Lines 72-74, delete:
"10. A process according to claim 9 in which the metal complex is nickel acetylacetonate or a nickel or vanadium etioporphyrin."

Col. 8, Lines 75-76, for "11. A process according to claim 9 in which the metal complex is a" read -- 11. A process according to claim 9 in which the metal complex is a rhodium complex. --

Signed and sealed this 27th day of June 1972.

(SEAL)
Attest:

EDWARD M. FLETCHER, JR.
Attesting Officer

ROBERT GOTTSCHALK
Commissioner of Patents